May 15, 1923.
A. A. AXIOTES
LOBSTER TRAP
Filed Dec. 22, 1922
1,455,381
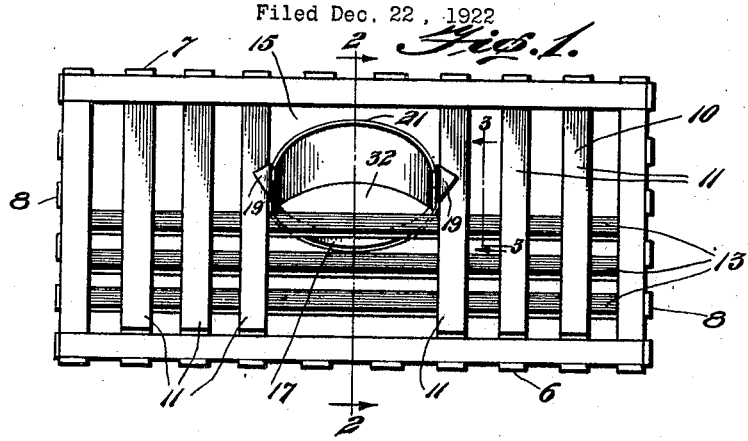

Patented May 15, 1923.

1,455,381

UNITED STATES PATENT OFFICE.

ANTHONY A. AXIOTES, OF NEWPORT, RHODE ISLAND.

LOBSTER TRAP.

Application filed December 22, 1922. Serial No. 608,438.

*To all whom it may concern:*

Be it known that I, ANTHONY A. AXIOTES, a citizen of the United States, residing at Newport, in the county of Newport and State of Rhode Island, have invented certain new and useful Improvements in Lobster Traps, of which the following is a specification.

My invention relates to lobster traps.

The cautious habits of lobsters and their distinctive peculiarities render fish traps useless in the capture of the lobster. For instance a lobster will not attempt ingress into a trap at any point where the bait is not visible through the ingress point. For this reason approaches constructed of netting have been employed, but they have become broken or the lobster has become entangled and ultimately escaped. No provision has heretofore been made for admitting lobsters of different sizes; nor has provision been made for enabling the lobster to make a preliminary survey of the bait as he enters.

The essential objects of this invention are to overcome the above enumerated disadvantages, and to attain the desired results in a desirable, inexpensive, and readily exchangeable structure.

To the above ends primarily my invention consists in such parts and in such combinations of parts as fall within the scope of the appended claims.

In the accompanying drawings which form a part of this specification—

Figure 1 is a front elevation of my novel trap,

Figure 2, a section on line 2—2 of Figure 1,

Figure 3, an enlarged fragmentary section on line 3—3 of Figure 1, and

Figure 4, an enlarged perspective view of the entrance member, showing the same in full lines closed, and in broken lines open.

Like reference characters indicate like parts throughout the views.

The body, frame or shell of the trap as herein illustrated is rectangular including a slotted bottom or base 6, top 7, sides 8, rear end wall 9, and front end wall 10. The wall or frame 10 is provided on each side of its center with spaced vertical slats or strips 11, and has at its top a horizontal slat 12, and near its bottom, horizontal slats 13. The upper middle portion of the member 10 has, therefore, a resultant opening 15 in which is located the entrance device which is preferably of thin noncorrosive or galvanized metal, easily cut and shaped from a sheet.

In detail the device comprises a rectangular relatively stationary transversely arcuate or semicircular lower plate 17, the forward corners of whose upturned ends 18 are bent 90 degrees forming diagonally disposed lateral lugs 19. Pivotally mounted on the lower plate above the latter is an arched or transversely arcuate plate 21, substantially rectangular except that its downturned ends have their forward corners diagonally cut away forming resultant inclined lower edges 23 adapted to normally rest against the concave position of the lower member 17. The pivotal connections of the members 17 and 18 are in this instance cotter pins 25 passing loosely through perforations 26 and 27 in the forward corners of the portions 18 and 22 respectively. The legs 29 of the pins are clinched or expanded, and their eyes 30 project laterally from the exterior of the member 17. The weight of the member 21 causes it to normally assume the closed position shown in the figures, wherein it will be noted that even in closed position the closure is only partial and that there is always an opening 32 between the rear edges of the members 17 and 21.

The wall 10 is fixed by nails or otherwise to the walls 8. It is preferably rearwardly and upwardly inclined with its lower end engaging the forward edge of the floor 6. The metallic inducting members may be mounted in any preferred manner in the opening 15 of the wall. In this case, as shown in Figures 1 and 3, the lugs 19 overlap the fronts of adjacent slats 11, while the heads 30 of the pivot members overlap the backs of said slats, and the lower edge of the member 17 abuts against an adjacent slat 13, so that no attaching nails are necessary. If desired, however, nails may be inserted into said slats 11 through the eyes 30 or through perforations, not shown, in the lugs 19.

In operation the lobster initially elevates his head by placing his feet against one or more of the slats 13 and then rests his claws on the member 17 while he inspects the bait within the trap through the opening 32. He then advances and thus elevates the member 21 to a position such as shown in broken lines in Figure 4 so as to permit his entire body to enter the casing, after which the member 21 drops to original position and he is trapped.

While one end wall only is shown carrying the induction members 17 and 21 it will be understood that induction members may also be mounted in the rear wall 9 if so desired in which case it is preferable that the end wall 9 be inclined to a position corresponding to the position of wall 10.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:—

1. In a lobster trap, a case provided with an opening, a reversely arched induction plate in the opening supported by the case, and an arched induction plate eccentrically pivoted to the first plate and provided with inclined edges adapted to rest upon the first plate.

2. In a lobster trap, a case provided with an open end, an inclined frame closing the open end and provided with an opening, an induction plate fast in the opening, and a second induction plate in the opening pivotally supported upon the first plate.

3. A lobster trap comprising a case having a relatively fixed inclined end wall slatted and provided with an opening, and an entrance device comprising opposed plates pivotally united and pivotally mounted on said wall about said opening.

4. A lobster trap comprising a case having a relatively fixed inclined end wall slatted and provided with an opening, and an entrance device comprising opposed plates pivotally united and pivotally mounted on said wall about said opening and one movable within the other.

5. A lobster trap comprising a reticulated case having an end open, a slatted member in said end open and relatively fixed and having an opening, and cooperating plates mounted in said opening, one fixed to said member and the other pivotally mounted in the fixed member to gravitate therein to restrict the passage into the case.

In testimony whereof I have affixed my signature.

ANTHONY A. AXIOTES.